posed transversely of the truck intermediately between the ends of said curved portions.

12. A dispensing system for storing and locking in position with respect thereto at least a pair of collapsible luggage carts, for individually receiving at least one cart at one end thereof, and for individually dispensing at least one cart from an opposite end thereof in-line with the one cart which comprises, luggage carts, each cart having a handle portion and a forwardly-projecting pivotally-mounted swing frame comprising a collapsible luggage-support portion thereof, said swing frame having a forward end portion that is shaped and mounted for a push-in collapse of said swing frame, a frame defining opposed in-line cart-positioning stall portions open from opposite ends thereof, coin-operated latching means for said stall portions mounted on said frame to latch-engage the handle portions of the carts when they are being received and to release handle portions of the carts when they are being dispensed, an abutment carried by said frame upon which a cart being received by one of said stall portions may be advanced and supported in a collapsed relationship and upon which another in-line positioned cart may be simultaneously retained in a collapsed relationship with its handle portion in latch-engagement with said latching means, and said abutment being positioned to engage the forward end portion and push the swing frame to a collapsed relation when a cart is received by the stall portion.

13. A system for servicing luggage which comprises, at least one coin-operated luggage cart dispensing unit, luggage carts each having a handle portion, said dispensing unit defining opposed stall portions open from opposite end portions thereof to individually receive and position said carts therein and having coin-operated latching means at said stall portions to receive and latch-engage the handle portion of each of said luggage carts, each of said luggage carts having a luggage-receiving collapsible swing frame thereon, said swing frame having an upturned forward end portion mounted for a push-in collapse of said swing frame, and said dispensing unit having a backing member associated with its said stall portions to engage said forward end portion and collapse said swing frame by moving it upwardly when one of said carts is moved into one of said stall portions.

14. A dispensing system for storing and locking in position with respect thereto a plurality of collapsible luggage carts and for individually receiving at least one cart at one end thereof, and for individually dispensing at least one cart from an opposite end thereof wherein; each luggage cart has a handle portion and a substantially horizontal forwardly-projecting luggage-supporting swing frame having curved end portions, said swing frame has outer and inner end portions shaped and mounted for upward-collapsing movement on its inner end portion towards said handle portion when engaged at its outer end portion by an abutment, and which additionally comprises, a frame defining opposed cart-positioning stall portions open from opposite ends thereof, coin-operated latching means for each of said stall portions mounted on said frame to latch-engage and release the handle portion of a corresponding one of the luggage carts, an abutment member carried by said last-mentioned frame between its opposite ends against which a luggage cart being received by one of said stall portions may be advanced and collapsed, and said abutment member being positioned between opposite stall portions to push the outer end portion of said swing frame to move said swing frame into its last-defined position when one of the carts is advanced into one of said stall portions.

References Cited in the file of this patent

UNITED STATES PATENTS

| Number | Name | Date |
|---|---|---|
| D. 156,810 | Brownlee | Jan. 10, 1950 |
| 351,346 | Teal | Oct. 19, 1886 |
| 614,432 | Austin | Nov. 22, 1898 |
| 621,072 | Gregory | Mar. 14, 1899 |
| 877,758 | Connor | Jan. 28, 1908 |
| 1,099,584 | Wedge | June 9, 1914 |
| 1,428,180 | More | Sept. 5, 1922 |
| 1,653,927 | Pryor | Dec. 27, 1927 |
| 2,212,053 | Smith | Aug. 20, 1940 |
| 2,362,721 | Reynolds | Nov. 14, 1944 |
| 2,422,862 | Stottrup | June 24, 1947 |
| 2,490,988 | Wheeler | Dec. 13, 1949 |
| 2,554,091 | Davis | May 22, 1951 |
| 2,693,968 | Bateman | Nov. 9, 1954 |
| 2,753,970 | Breeler | July 10, 1956 |
| 2,792,233 | Stackhouse | May 14, 1957 |

FOREIGN PATENTS

| Number | Country | Date |
|---|---|---|
| 654,110 | France | Nov. 20, 1928 |
| 102,233 | Great Britain | July 19, 1916 |
| 280,482 | Great Britain | Nov. 17, 1927 |

July 29, 1958   V. D. POLHEMUS ET AL   2,845,279
VEHICLE TORSION SPRING SUSPENSION
Filed Aug. 31, 1954   3 Sheets-Sheet 1
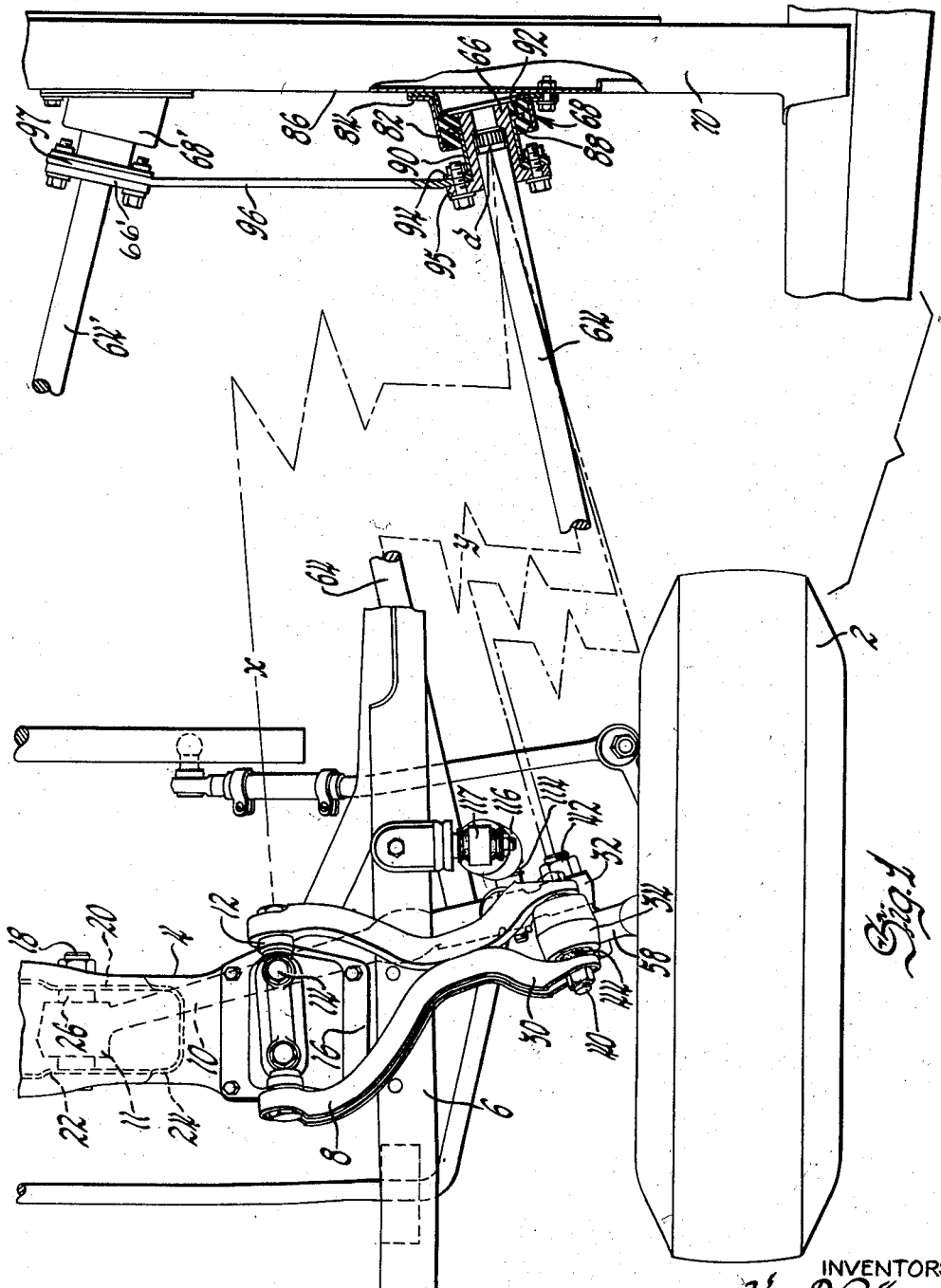
INVENTORS
Von D. Polhemus
& Max Ruegg
BY
Paul Fitzpatrick
ATTORNEY July 29, 1958　　V. D. POLHEMUS ET AL　　2,845,279
VEHICLE TORSION SPRING SUSPENSION
Filed Aug. 31, 1954　　3 Sheets-Sheet 2
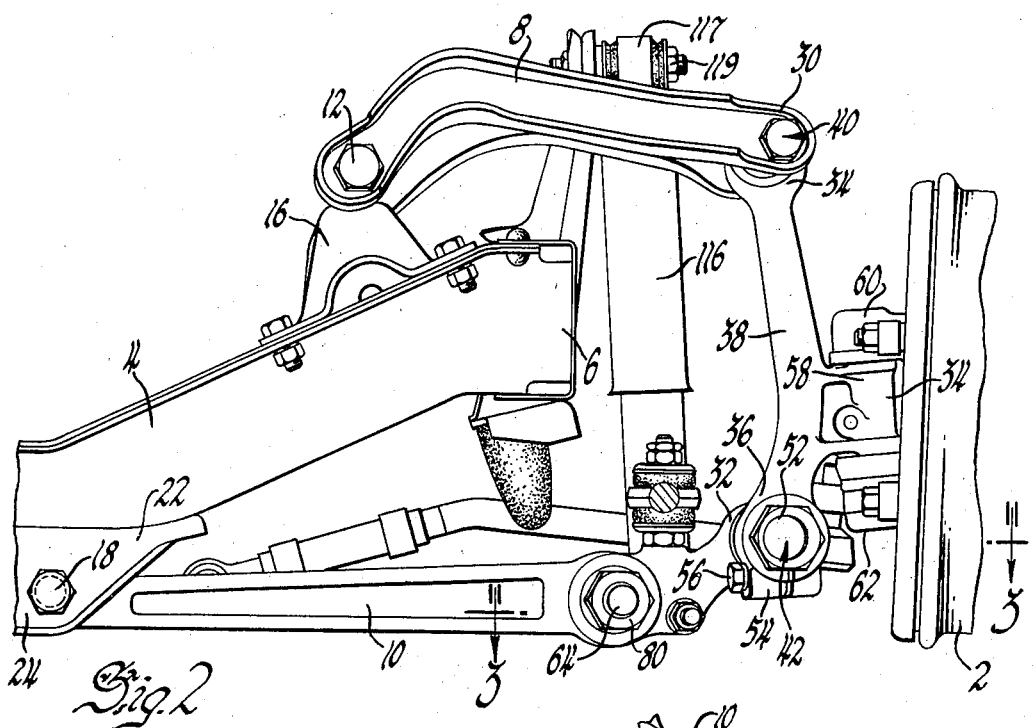
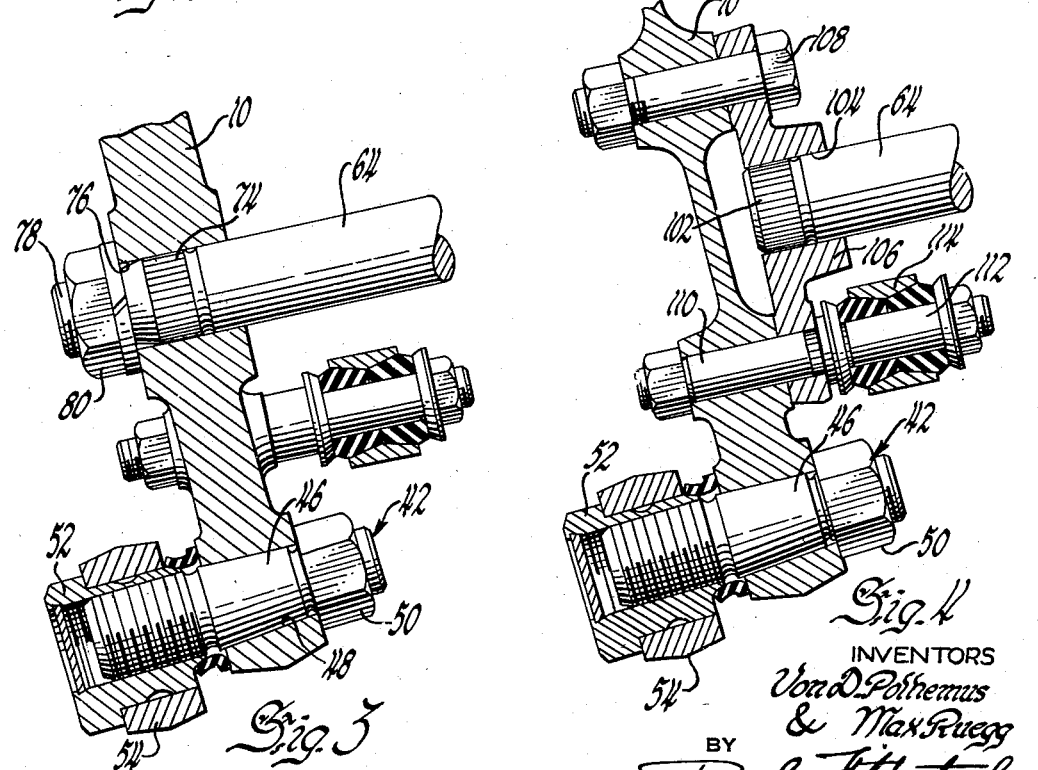
INVENTORS
Von D. Polhemus
& Max Ruegg
BY
Paul Fitzpatrick
ATTORNEY July 29, 1958 V. D. POLHEMUS ET AL 2,845,279
VEHICLE TORSION SPRING SUSPENSION
Filed Aug. 31, 1954 3 Sheets-Sheet 3
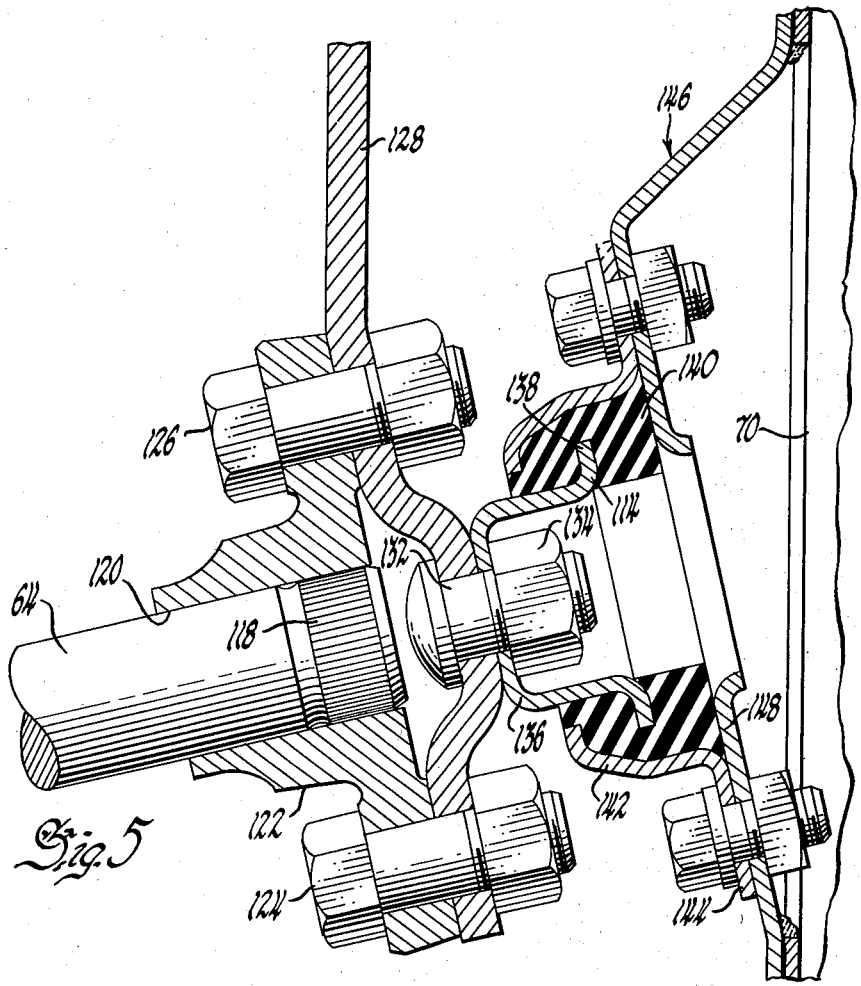
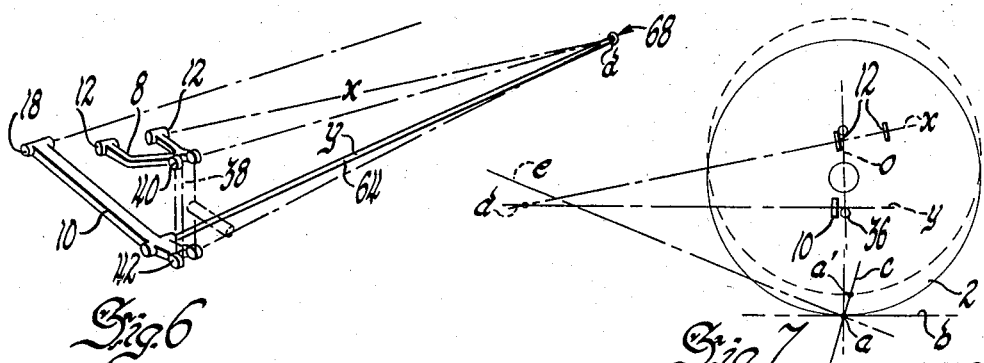
INVENTORS
Von D. Polhemus
& Max Ruegg
BY Paul Fitzpatrick
ATTORNEY

United States Patent Office 2,845,279
Patented July 29, 1958

2,845,279
VEHICLE TORSION SPRING SUSPENSION

Von D. Polhemus, Franklin, and Max Ruegg, Detroit, Mich., assignors to General Motors Corporation, Detroit, Mich., a corporation of Delaware Application August 31, 1954, Serial No. 453,269

5 Claims. (Cl. 280—96.2)

This invention relates to vehicle suspension and particularly to torsion spring suspension for dirigible front wheels of a vehicle.

An object of the present invention is to provide a vehicle suspension having wheel supporting linkage arranged to provide maximum resistance to "brake dive" while maintaining "wheel fight" at a minimum.

Another object is to provide a torsion spring suspension associated with a vehicle wheel dirigibly supported on upper and lower transversely extending links, wherein the torsion springing member is secured between one of the links and the vehicle in a manner providing torsional resistance to vertical deflection of the wheel and horizontal resistance to longitudinal thrust of the wheel.

A further object is to provide a suspension of the stated character wherein the torsion bars are anchored to the vehicle frame in a manner providing maximum resistance to bending caused by torque load on the torsion bars and controlled flexibly in torsion caused by vertical loads imposed on the bars.

A still further object is to provide in a suspension of the stated character a torsion bar anchoring assembly capable of yieldably absorbing longitudinal and radial loads imposed on the torsion bar, while providing positive resistance to torsional loads imposed thereon.

Still a further object is to provide a suspension of the stated character having resilient cushioning means associated with certain of the operative connections to reduce transmission of road noises from the wheel to the chassis.

Yet another object is to provide a torsion bar suspension wherein no static vertical load is imposed on the vehicle chassis by the torsion bars when the torsional loads thereon are equal, and the maximum transitory vertical load imposed on the chassis is equal to the difference in torsional loading of the respective bars.

Yet another object is to provide simplified and efficient means for mounting the torsion bars to suspension links.

These and other objects and advantages of the invention will become more fully apparent by reference to the accompanying description and drawings wherein:

Fig. 1 is a plan view of the left front wheel suspension embodying the invention.

Fig. 2 is an enlarged fragmentary front elevational view of the structure shown in Fig. 1.

Fig. 3 is an enlarged fragmentary sectional view looking in the direction of arrows 3—3 of Fig. 2, showing the means of securing the torsion bar and lower control arm.

Fig. 4 is an enlarged fragmentary sectional view similar to Fig. 3, showing a modification of the torsion bar mount.

Fig. 5 is an enlarged fragmentary sectional plan view of a modified form of a rear torsion bar mount.

Fig. 6 is a diagrammatic perspective view showing the converging relation of the respective pivotal axes of the suspension, and Fig. 7 is a diagrammatic elevational view of one of the front wheels of the vehicle, illustrating the operational characteristics of the invention.

Referring now to the drawings and particularly Fig. 1, there is illustrated the left front suspension of a vehicle, wherein the reference numeral 2 indicates a vehicle road wheel upon which is suspended a vehicle frame which includes a drop center front cross member 4 and a side frame member 6 secured thereto. Wheel 2 is dirigibly connected to frame cross member 4 by means of generally transversely extending wish bone type upper control arm 8 and a generally parallel lever type lower control arm 10 spaced vertically downwardly therefrom. At its inner longitudinally spaced ends, control arm 8 is pivotally secured to a threaded pivot member 12 which, in turn, is bolted to the upper inclined surface 14 of a sheet metal bracket 16. Bracket 16 is, in turn, bolted to the upper surface cross member 4 to align pivot shaft 12 in a plane wherein arm 8 is vertically swingable about an axis which is downwardly and rearwardly inclined with respect to the horizontal and is slightly rearwardly inwardly converging with respect to the longitudinal midline of the vehicle. Lower control arm 10 is disposed below cross member 4 and extends outwardly in generally parallel relation with upper control arm 8. At its inner end, control arm 10 is provided with an enlarged hub 11 having a longitudinally directed bore formed therein, which embraces a generally horizontally extending pivot shaft 18. Shaft 18 in turn, is secured between the front and rear faces 20 and 22 of a depending channel-like structure 24 formed on the lower surface of cross member 4. To cushion transverse and longitudinal shock imposed on control arm 10, an annular rubber bushing assembly 26 is disposed between bore 13 of control arm 10 and shaft 18.

At their outer ends 30 and 32, respectively, upper control arm 8 and the lower control arm 10 are pivotally connected to the upper end 34 and lower end 36, respectively, of a steering knuckle support 38, by means of pivot connections 40 and 42. Connection 40 includes an annular rubber mass 44 similar to that utilized at the inner end of arm 10 and is effective to cushion shock transmitted from knuckle support 38. As seen best in Fig. 3, pivot connection 42 is provided with a rearwardly extending tapered end 46 which is adapted to be drawn into locking engagement with the tapered bore 48 at the outer end of control arm 10 by threaded means 50. A rotatable eccentric bushing 52 is sleeved in the split collar 54 formed on the lower end of knuckle support 38 and threadably embraces the threaded portion of pivot connection 42. By rotating bushing 52, wheel camber may be adjusted to the desired inclination. After adjustment, a bolt 56 is drawn up to lock bushing 52 against rotation in split collar 54. A steering knuckle 58 formed intermediately on knuckle support 38 is pivotally secured to upper and lower wheel knuckles 60 and 62 by means of a conventional king pin. It will be understood that the form and arrangement of the suspension for the right front wheel is reversely similar.

To yieldably support the vehicle chassis with respect to the wheel 2, a generally horizontal disposed torsion rod 64 is rigidly secured at its forward end to lower control arm 10 and at its rearward end is rigidly secured to the inner wall of a flanged sleeve 66 which, in turn, is flexibly supported in a torsion bar support 68 mounted on intermediate frame cross member 70. As seen best in Fig. 3, the forward end of bar 64 is provided with a splined or knurled portion 74 which is adapted for gripping engagement with the inner peripheral wall of an aperture 76 formed near the outer end of control arm 10. To facilitate connection of bar 64 with arm 10, the forward extremity of the bar is tapered to a reduced diameter and threaded at 78. It will be apparent that the reduced portion of bar 64 may be readily inserted through aperture 76 a sufficient distance to permit initial engagement of a nut 80 with threads 78. Thereafter by rotation of nut 80, the splined portion 74 of bar 64 is drawn into gripping engagement with the inner periphery of aperture 76 of lower control arm 10. Conversely, bar 64 may be easily removed for replacement or adjustment by backing off nut 80 and employing a tool such as a conventional wheel puller, to force the splined end 74 out of aperture 76.

As seen best in Fig. 1, torsion bar support 68 has a cylindrical cup-shaped forward portion or casing 82 and is provided with an integral circumferential flange portion 84 which is angled with respect to the axis of cylindrical portion 82. Flange 84 is adapted to be bolted to the forward face 86 of intermediate cross member 70 to secure the cylindrical portion 82 in axial alignment with the normal axis of bar 64. An annular rubber mass 88 is bonded to the inner peripheral wall of cylindrical portion 82 and a sleeve-like member 90 is, in turn, bonded with its outer wall interiorly of rubber mass 88 in concentric relation with the inner peripheral wall thereof. At its rearward end, sleeve 90 is provided with an outwardly directed circumferential flange portion 92 which extends into the intermediate portion of rubber mass 88 and to assure maximum bonded contact between the sleeve 90 and rubber mass 88 and permit the latter to function in compression, tension, torsion and shear. At its forward end, sleeve 90 is formed with a second circumferential flange 94 having a plurality of bolt apertures formed therein. Flanged sleeve 66 is slidably received in sleeve 90 contacting with its outer wall the inner wall of sleeve 90 and is rigidly connected thereto by means of bolts which extend through flanges 94 and 95. It will be apparent that rubber bushing 88 will yieldably absorb longitudinal thrust exerted on bar 64 as well as cushion radial and torsion loads imposed thereon. To positively anchor the rear ends of bars 64 and 64' against rotation, there is provided a common elongated anchor arm 96 which extends between the flanged sleeve 66 secured to torsion bar 64 and the identical flanged sleeve 66' of the opposite identical torsion bar 64' associated with the right front wheel suspension. Arm 96 is preferably rigid with respect to bending forces applied in a vertical direction, but is slightly resilient with respect to horizontally applied bending forces. At its opposite ends, arm 96 is provided with integral ring or connecting portions 97 having bolt apertures formed therein. Each ring portion 97 has opposite side faces and is disposed between and registers with the flanges of sleeves 66 and 90 and is rigidly connected therewith by the bolts previously mentioned. When bars 64 and 64' and arm 96 are connected in the manner described, it will be seen that torsional load applied to either bar 64 or 64' will tend to swing anchor arm 96 either upwardly or downwardly, depending upon the direction of application of torque. However, when equal and opposite torsional load is applied to the bars 64 and 64', the leverage applied to anchor arm 96 by one torsion bar is transmitted to the opposite torsion bar and vice versa. Thus, the vertical load resulting from equal and opposite torsional load on each of the bars is balanced by arm 96 and produces a closed system wherein no static vertical is imposed on the chassis. The novel effect of the common anchor arm 96 may best be illustrated by comparison with a smilar suspension wherein separate lever arms react against a fixed stop on the vehicle chassis to resist torsional loads applied to torsion bars by vertical deflection of the wheels. In the latter instance, it will be apparent that torsional loading of each bar will cause the lever arm to exert either downward or upward vertical load directly on the chassis. The total vertical load on the chassis will, of course, be equal to the combined torsional loading on each of the torsion spring members. However, in the present invention, no positive resistance by the vehicle frame is required to resist rotation of the torsion bars. Consequently, vertical loading of the chassis occurs only under conditions where torsional loading of the respective torsion bars is unequal. Thus, for example, when the torsional loading on the left torsion bar exceeds that of the right torsion bar, common anchor arm 96 applies leverage to the chassis in the locality of the right torsion bar support 68' which, in turn, imposes a vertical load on the chassis equal to the difference between the torsional loading of the left torsion bar and the right torsion bar. As pointed out previously, arm 96 is slightly flexible with respect to horizontally directed forces and is capable of limited torsional deflection. Because of this characteristic, common anchor 96 does not interfere with vertical swinging movement of either torsion bar resulting from vertical deflection of the wheels and permits longitudinal movement of the bars within the limits allowed by resilient torsion bar support 68.

In Figs. 4 and 5, there are illustrated modifications of the front torsion bar securing means and the resilient torsion bar rear support and common anchor arm assembly associated therewith.

In the modified embodiment shown in Fig. 4, the serrated forward end 102 of bar 64 is press fitted into gripping engagement with the central bore 104 of a flanged coupling member 106 which, in turn, is secured to lower control arm 10 by bolt 108 and double ended bolt 110. The outer end 112 of bolt 110 provides the pivot support for the sleeve connector 114 formed on the lower half of shock absorber 116. At its upper end, shock absorber 116 is provided with a sleeve connector 117, which is connected to a laterally extending pivot shaft 119 secured to frame 6. In the modification shown in Fig. 5, the rear serrated end 118 of bar 64 is press fitted into gripping engagement with the central bore 120 of a flanged collar 122 which, in turn, is secured by bolts 124 and 126 at one of the connecting portions at opposite ends of common anchor arm 128. Anchor arm 128 is secured by a bolt 132 and nut 134 to a generally cup-shaped member 136 having an outwardly flared circumferential flange 138. Member 136 is bonded interiorly of an annular rubber mass 140 which, in turn, is bonded to the inner wall of a second cup-shaped member 142 disposed in concentric relation with member 136. Member 122 constitutes an intermediate member between the rear end of torsion bar 64 and the associated connecting portion of the anchor arm 128 and member 136 is an intermediate member between anchor arm 128 and flexible support 140, 142. Members 122 and 136 are equivalent to sleeves 66, 90 of Fig. 1. Member 142 is formed with an outwardly flared circumferential flange 144 which is adapted to be bolted to an angle bracket 146. Angle bracket 146 is bent to provide an inclined forward surface 148 which is normal to the axis of rotation of torsion bar 64 and is secured to intermediate frame cross member 70 in any suitable manner, such as welding. By utilizing the modified construction shown in Figs. 4 and 5, the time and